(12) United States Patent
Bivens et al.

(10) Patent No.: US 11,153,164 B2
(45) Date of Patent: Oct. 19, 2021

(54) LIVE, IN-LINE HARDWARE COMPONENT UPGRADES IN DISAGGREGATED SYSTEMS

(71) Applicant: INTERNATIONAL BUSINESS MACHINES CORPORATION, Armonk, NY (US)

(72) Inventors: John A. Bivens, Ossining, NY (US); Min Li, San Jose, CA (US); Ruchi Mahindru, Elmsford, NY (US); HariGovind V. Ramasamy, Ossining, NY (US); Yaoping Ruan, White Plains, NY (US); Valentina Salapura, Chappaqua, NY (US); Eugen Schenfeld, South Brunswick, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 119 days.

(21) Appl. No.: 15/398,329

(22) Filed: Jan. 4, 2017

(65) Prior Publication Data

US 2018/0191559 A1 Jul. 5, 2018

(51) Int. Cl.
*G06F 13/00* (2006.01)
*H04L 12/24* (2006.01)
(Continued)

(52) U.S. Cl.
CPC .......... *H04L 41/082* (2013.01); *G06F 11/07* (2013.01); *G06F 13/00* (2013.01); *H04L 41/06* (2013.01);
(Continued)

(58) Field of Classification Search
CPC .. H04L 67/1095; H04L 67/2842; H04L 43/16; H04L 41/06; H04Q 2201/804; G06F 13/00; G06F 11/07
See application file for complete search history.

(56) References Cited

U.S. PATENT DOCUMENTS

| 6,049,851 A | 4/2000 | Bryg et al. |
| 6,463,584 B1 | 10/2002 | Gard et al. |

(Continued)

FOREIGN PATENT DOCUMENTS

WO 2007139542 A1 12/2007

OTHER PUBLICATIONS

Lim et al., "System-level Implications of Disaggregated Memory," 18th International Symposium of High Performance Computer Architecture, IEEE, 2011.
(Continued)

*Primary Examiner* — Emmanuel L Moise
*Assistant Examiner* — Xiang Yu
(74) *Attorney, Agent, or Firm* — Griffiths & Seaton PLLC

(57) ABSTRACT

Various embodiments for performing hardware upgrades in a disaggregated computing environment. A workload is run on a disaggregated computing system while providing a new component to at least one of a plurality of component pools used by the disaggregated computing system. Point-to-point circuit wire level switching is used to switch the disaggregated system from an assigned component residing in a first of the plurality of component pools to the new component residing in a second of the plurality of component pools without interrupting the running workload.

24 Claims, 7 Drawing Sheets

(51) Int. Cl.
*H04L 29/08* (2006.01)
*G06F 11/07* (2006.01)
*H04L 12/26* (2006.01)

(52) U.S. Cl.
CPC .......... *H04L 41/0896* (2013.01); *H04L 67/10* (2013.01); *H04L 67/1031* (2013.01); *H04L 67/1095* (2013.01); *H04L 67/16* (2013.01); *H04L 67/2842* (2013.01); *H04L 43/50* (2013.01)

(56) References Cited

U.S. PATENT DOCUMENTS

| | | | |
|---|---|---|---|
| 6,795,896 B1 | 9/2004 | Hart et al. | |
| 8,819,092 B2 | 8/2014 | Ludwig et al. | |
| 8,856,776 B2 | 10/2014 | Mahajan et al. | |
| 8,938,518 B2 | 1/2015 | Anderson et al. | |
| 9,053,027 B1 | 6/2015 | Harvey et al. | |
| 9,229,707 B2 | 1/2016 | Borissov et al. | |
| 9,262,225 B2 | 2/2016 | Davis et al. | |
| 9,411,648 B2 | 8/2016 | Sims | |
| 9,473,362 B2 | 10/2016 | Fall et al. | |
| 9,760,527 B2 | 9/2017 | Egi et al. | |
| 10,037,203 B1 | 7/2018 | Chavez et al. | |
| 2002/0129186 A1* | 9/2002 | Emerson | G06F 13/4081 710/302 |
| 2002/0144035 A1 | 10/2002 | Matsuo et al. | |
| 2002/0191247 A1* | 12/2002 | Lu | H04B 10/03 398/79 |
| 2003/0225986 A1 | 12/2003 | Teshima | |
| 2004/0205776 A1 | 10/2004 | Harrington et al. | |
| 2006/0218545 A1 | 9/2006 | Taguchi | |
| 2007/0050538 A1* | 3/2007 | Northcutt | G06F 3/0626 711/112 |
| 2007/0094656 A1 | 4/2007 | Talati et al. | |
| 2008/0162807 A1 | 7/2008 | Rothman et al. | |
| 2008/0215915 A1 | 9/2008 | Zhou et al. | |
| 2009/0217023 A1 | 8/2009 | Griech et al. | |
| 2011/0035740 A1 | 2/2011 | Powell et al. | |
| 2011/0093843 A1 | 4/2011 | Endo et al. | |
| 2012/0005461 A1* | 1/2012 | Moir | G06F 9/3863 712/228 |
| 2012/0110150 A1 | 5/2012 | Kosuru et al. | |
| 2012/0174124 A1 | 7/2012 | Ward et al. | |
| 2013/0132587 A1 | 5/2013 | Morris | |
| 2013/0326126 A1 | 12/2013 | Kondoh | |
| 2014/0095624 A1 | 4/2014 | Duan | |
| 2014/0095819 A1* | 4/2014 | Ono | G06F 11/3485 711/162 |
| 2014/0122802 A1* | 5/2014 | Koka | G06F 12/0848 711/118 |
| 2014/0280687 A1 | 9/2014 | Egi et al. | |
| 2014/0314417 A1* | 10/2014 | Leigh | H04L 41/12 398/79 |
| 2015/0120809 A1 | 4/2015 | Braemer et al. | |
| 2015/0149658 A1 | 5/2015 | Wei | |
| 2015/0212908 A1 | 7/2015 | Andrews et al. | |
| 2015/0271865 A1 | 9/2015 | Carson et al. | |
| 2015/0341229 A1 | 11/2015 | Richter et al. | |
| 2015/0378706 A1 | 12/2015 | Roese et al. | |
| 2016/0055119 A1 | 2/2016 | Egi et al. | |
| 2016/0092203 A1 | 3/2016 | Filali-Adib et al. | |
| 2016/0232010 A1 | 8/2016 | Dicks et al. | |
| 2016/0246652 A1 | 8/2016 | Herdrich et al. | |
| 2016/0306623 A1 | 10/2016 | Su et al. | |
| 2016/0366498 A1* | 12/2016 | Robinson | H04J 14/0212 |
| 2017/0054603 A1* | 2/2017 | Kulkarni | H04L 41/0893 |
| 2017/0149880 A1 | 5/2017 | Lochhead et al. | |
| 2017/0257970 A1* | 9/2017 | Alleman | G06F 1/184 |
| 2017/0364428 A1* | 12/2017 | Ganesan | G06F 11/1471 |
| 2018/0024964 A1* | 1/2018 | Mao | G06F 15/161 711/173 |
| 2018/0026851 A1 | 1/2018 | Adiletta et al. | |
| 2018/0027681 A1* | 1/2018 | Davis | H05K 7/1498 361/679.31 |
| 2018/0081709 A1 | 3/2018 | Okazaki | |
| 2018/0136940 A1 | 5/2018 | Mallichan et al. | |
| 2018/0150343 A1 | 5/2018 | Bernat et al. | |
| 2019/0028345 A1 | 1/2019 | Kommula et al. | |
| 2019/0028348 A1 | 1/2019 | Chai | |
| 2019/0028400 A1 | 1/2019 | Kommula et al. | |
| 2019/0034383 A1 | 1/2019 | Schmisseur et al. | |

OTHER PUBLICATIONS

P. Hosek and C. Cadar, "Safe software updates via multi-version execution,"2013 35th International Conference on Software Engineering (ICSE), San Francisco, CA, 2013, pp. 612-621. (Year:2013).

Hewlett Packard Enterprise, "HPE Synergy: The first platform architected for composability to bridge Traditional and Cloud Native apps," Feb. 2016, last retrieved from https://h20195.www2.hpe.comN2/getpdf.aspx/4AA6-3257ENW.pdf? on Sep. 2019. (Year:2016).

* cited by examiner

US 11,153,164 B2

LIVE, IN-LINE HARDWARE COMPONENT UPGRADES IN DISAGGREGATED SYSTEMS

BACKGROUND OF THE INVENTION

Field of the Invention

The present invention relates generally to large scale computing, and more particularly to pooling and dynamically distributing hardware resources for enhanced computing efficiency.

Description of the Related Art

A popular type of large scale computing is cloud computing, in which resources may interact and/or be accessed via a communications system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

Cloud computing may be provided as a service over the Internet, such as in the form of "Infrastructure as a Service" (IaaS), "Platform as a Service" (PaaS), and/or "Software as a Service" (SaaS). IaaS may typically provide physical or virtual computing devices and/or accessories on a fee-for-service basis and onto which clients/users may load and/or install, and manage, platforms, applications, and/or data. PaaS may deliver a computing platform and solution stack as a service, such as, for example, a software development platform, application services, such as team collaboration, web service integration, database integration, and/or developer community facilitation. SaaS may deploy software licensing as an application to customers for use as a service on demand. SaaS software vendors may host the application on their own clouds or download such applications from clouds to cloud clients, disabling the applications after use or after an on-demand contract expires.

The provision of such services allows a user access to as much in the way of computing resources as the user may need without purchasing and/or maintaining the infrastructure, such as hardware and/or software, that would be required to provide the services. For example, a user may instead obtain access via subscription, purchase, and/or otherwise securing access. Thus, cloud computing may be a cost effective way to deliver information technology services. However, cloud computing may also be hindered by issues of resource configuration and allocation aspects.

SUMMARY OF THE INVENTION

Various embodiments for performing and evaluating hardware upgrades in a disaggregated computing environment are provided. In one embodiment, a method comprises running a workload on a disaggregated computing system while providing a new component to at least one of a plurality of component pools used by the disaggregated computing system; and using point-to-point circuit wire level switching to swap the disaggregated system from an assigned component residing in a first of the plurality of component pools to the new component residing in a second of the plurality of component pools without interrupting the running workload.

In addition to the foregoing exemplary embodiment, various other system and computer program product embodiments are provided and supply related advantages. The foregoing Summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
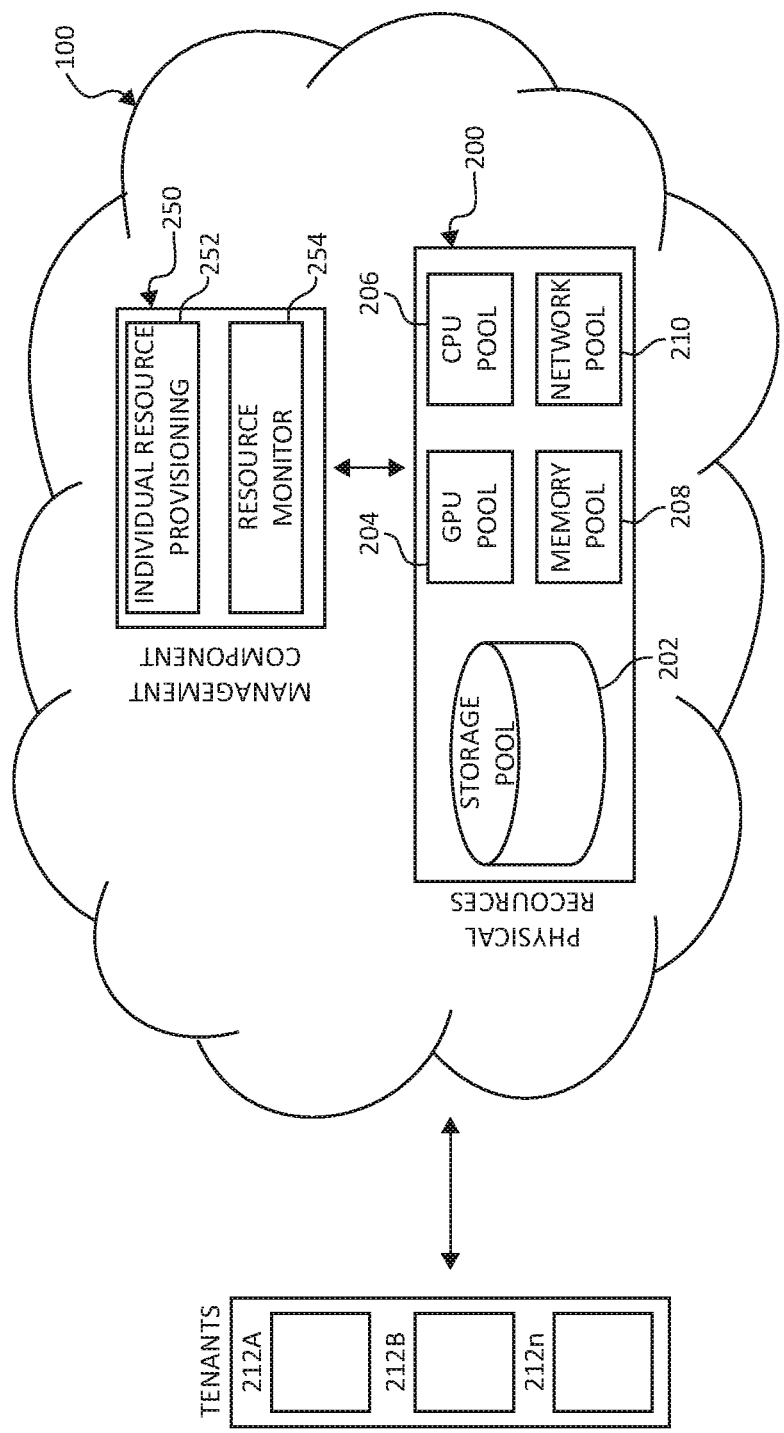
FIG. 1 is a block diagram showing a hardware structure of a disaggregated computing environment, in which aspects of the present invention may be realized.

Computing resources are usually pre-configured by vendors at fixed levels of configurations. One aspect is that each individual computing resource, such as memory size, number of central processing units (CPUs), disk size, etc. has a limited boundary. Another aspect is that each computing platform has a limited number of physical customization options. Today's workloads are running under these limitations, which subsequently is a reason that techniques such as memory swapping and caching optimization are used in computing environments.

The emergence of cloud computing changes the paradigm of how people utilize computing resources by providing a pay-as-you-go model. The public cloud has been created by service providers to allow access to those who need such computing resources on demand. As aforementioned, access to cloud resources is provided through the Internet or private network connections or through co-location of fixed infrastructure held as a base, augmented by on demand resources when needed. The underlying infrastructure, however, is a set of fixed computing configurations which provide inflexibility when scaling or descaling demands are appropriate.

The underlying architecture of the Infrastructure as a Service (IaaS) cloud is generally traditional hardware used in data centers as described above. Users either access the hardware directly, or access virtual machines contained thereon. However, because of the fixed nature of building servers as enclosures that are configured once, when the enclosure is built, the fundamental architecture underneath the data center is very rigid and inflexible. It is thus the cloud software that provides the emulation to create the flexible, on-demand functionality that cloud services are known for. This functionality is quite limited however, as many mechanisms depend on software relying on server enclosures, which architectures originated early in the Personal Computer era, turning into an on-demand service.

The Virtual Machine (VM) is a software technique based on an entity that runs on a part of a server, possibly with other such entities sharing the same server. It represents the unit of on-demand computation, where each such entity is designated with a pre-defined number of virtual CPUs and memory. Once defined, for some platforms (operating system types), it is possible to modify the processor and memory shares without rebooting the VM as long as the resources are available and not already committed to other VMs. Even if the resources are taken, some cloud vendors may over commit the resources merely based on allocation. However, because such a VM shares the hardware resources of a fixed pre-built server enclosure with other VMs, it may not be possible to displace other users to make room for the resource expansion of a first user. While such is possible in principle (e.g. by migrating other users (live VM migration) to other servers), such an operation would create an abundant increase in traffic and require an overload on a datacenter network. In addition, the provisioning of new VMs on-demand can take an impractical amount of time, relatively speaking (e.g. minutes, while real-world events may require a response to events in sub-second times). Thus the notion of true, real-world and corresponding on-demand cloud infrastructure does not exist. This situation may force users to provision resources for worse-case needs (max processor number/speed, max memory) and to keep VMs even if unneeded, only to be able to respond to real-world events in relative time.

For cloud services achieved via Application Programming Interfaces (APIs), users do not access the operating system directly, but rather issue requests via the APIs. The computation is then handled by the underlying operating system and hardware infrastructure. Some vendors provide a certain level of scaling and elasticity that are transparent to user APIs. However, the level of scaling is limited by the type of application and by the capacity of the individual computing resource. For example, if a workload requires a high demand of memory usage, it is not possible to scale up on memory size individually. Therefore, the overall resource utilization is poor and this solution is not cost-effective either.

In view of the forgoing, disaggregated computing systems provide flexibility and elasticity in constructing bare-metal computing systems for use in the cloud, to provide on-demand flexibility to cloud users, or "tenants". A disaggregated computing system is referred to as a system with large pools of physical hardware resources, such as CPUs, accelerators, memory devices, and storage devices, whose connectivity with each other individual hardware resource can be dynamically switched without shutting down any hardware nor running applications. Individual hardware resources from these pools can be selected to assemble computer systems on-demand. Thus, a bare-metal computer system with a flexible capacity of individual computing resources may be assembled in a disaggregated system in a manner that most suits the respective workload. In one embodiment, for example, a system may be constructed with an extremely high memory capacity but with a more moderate capacity of CPU and other resources, for a memory-intensive workload. Most disaggregated system designs currently known in the art are copy-based systems in which a process state is copied over a memory fabric to local memory at the computation hardware because of the latency in connecting directly to the pool over the memory fabric or over a symmetric multiprocessing (SMP) system. The copying process requires time which limits how quickly resources can be switched in these systems. The present invention is particularly suited for point-to-point based disaggregated systems in which system components are connected through point-to-point based wire-level switching (with such mediums as optical links, etc.). In a point-to-point based disaggregated system, the switching between system components in a pool can happen in milliseconds or less enabling a continuous, instantaneous execution of processes even while the computing components are switched.

With the foregoing being considered, in traditional information technology (IT) systems, hardware upgrades are disruptive, requiring systems and their workloads to be taken offline. If disruption is not permitted, some environments use redundancy to allow alternate systems to take the load from the systems which must be taken offline. Some IT environments also deploy virtualization techniques which allow administrators to virtualize computing resources and run workloads in VMs which then can be migrated to other real machines for planned outages such as hardware upgrades. At the system component level, some of the same techniques, redundancy and virtualization, are leveraged to permit some form of hardware component upgrades in high-end systems.

Attempting live upgrades in systems which aren't employing some of the techniques above can have serious consequences. However, even these techniques when enabled come with considerable drawbacks. While virtualization has become popular, some workloads cannot be virtualized for performance, service level agreement (SLA), or licensing reasons and must undergo costly maintenance windows and/or outages when hardware upgrades are needed. Virtualizing and migrating data intensive workloads such as in memory databases or big data analytics could mean moving hundreds of gigabytes, which can cause congestion, delays, and inflexibility in the event the operation needs to be reversed. Lastly, techniques based on redundant hardware are typically only available in high-end systems at an added expense.

Accordingly, the present invention focuses on leveraging the attributes of the disaggregated system to provide an efficient mechanism for live, in-line (no redundant hardware) hardware upgrades which require no downtime and little if any performance disruption to the workload. Through the mechanisms of the present invention, hardware upgrades can be made seamless, allowing administrators to easily upgrade and evaluate the impact of the upgrade and simply switch back to the previously assigned components if the expected outcome (performance or otherwise) isn't observed or some incompatibility with the new hardware is detected.

Turning now to FIG. 1, a block diagram of a disaggregated computing environment is illustrated, including cloud environment 100. Within cloud environment 100 is the disaggregated computing system comprising physical hardware resources 200. Physical hardware resources 200 may comprise of classifications of the hardware resources such as a storage device pool 202, a Graphics Processing Unit (GPU) device pool 204, a CPU device pool 206, a memory device pool 208, and a network device pool 210. The physical hardware resources 200 are in communication with a management module 250. Management module 250 may comprise of such components as an individual resource provisioning component 252 and a resource monitor 254, each described herein.

In communication with the cloud environment 100, the management module 250, and the physical hardware resources 200, are tenants 212A, 212B, and 212n. Tenants 212A, 212B, and 212n may communicate with the cloud environment 100 by way of the management module 250, and thus the physical hardware resources 200 provided by any signal-bearing medium.

It should be noted that the elements illustrated in FIG. 1 provide only an example of related components that may be included in the disaggregated computing architecture. For example, management module 250 may include other components than individual resource provisioning component 252 and resource monitor 254, and physical hardware resources 200 may include other component classifications than storage device pool 202, GPU device pool 204, CPU device pool 206, and memory device pool 208, while staying in spirit and scope of the present invention. Additionally, the duties of the management module 250, and thus the components therein, may be performed and comprised of physical components, computer code, or a combination of such.

In one embodiment, the management module 250 interacts with an individual tenant 212A-n to receive workload requests and locate the best suitable hardware resources for the given workload. Individual hardware resources of the physical hardware resources 200 are tracked and a mapping is maintained between each respective tenant 212A-n and respective assigned hardware resource. Each hardware resource is identified using a unique identifier. This identifier may be a physical identifier (e.g. barcode) and/or a virtual identifier (e.g. code based). The management module 250, or any other suitable modules or means known in the art may be used to accomplish these mechanisms.

Figure 2:
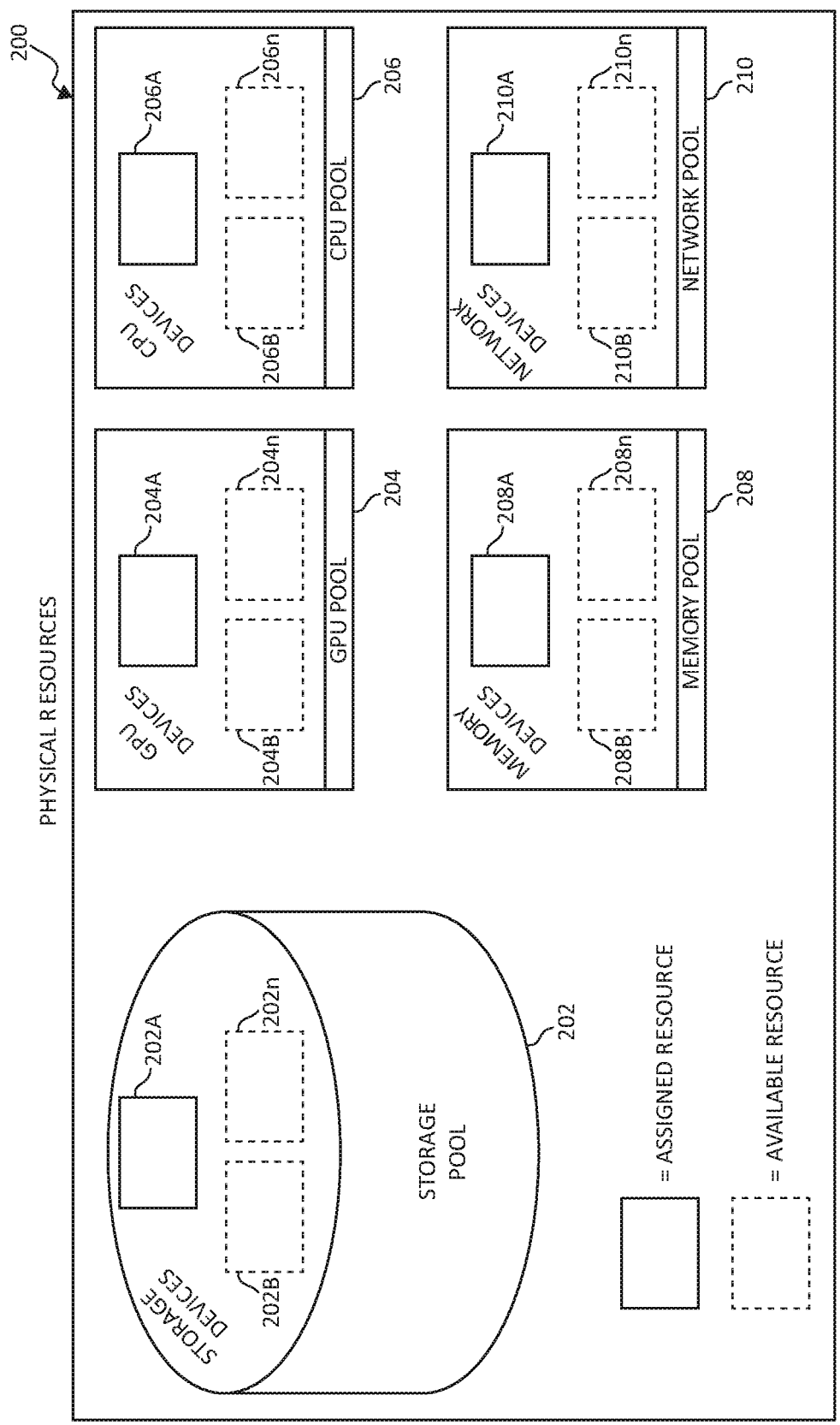
FIG. 2 is an additional block diagram showing a hardware structure of a disaggregated computing environment, in which aspects of the present invention may be realized.

FIG. 2 is a block diagram illustrating the physical hardware resources 200 portion of FIG. 1. Included in the storage device pool 202 are storage devices 202A, 202B, and 202n. The GPU device pool 204 includes GPU devices 204A, 204B, and 204n. The CPU device pool 206 includes CPU devices 206A, 206B, and 206n. The memory device pool 208 includes memory devices 208A, 208B, and 208n. Finally, the network device pool 210 includes network devices 210A, 210B, and 210n. Each aforementioned hardware resource may be in communication with an additional one or more aforementioned hardware resources via a signal-bearing medium.

Within physical hardware resources 200, each hardware resource appearing in solid line (i.e. storage device 202A, GPU device 204A, CPU device 206A, memory device 208A, and network device 210A) are assigned hardware resources to one or more tenants (i.e. tenants 212A, 212B, 212n). Hardware resources appearing in dashed line (i.e. storage devices 202B, 202n, GPU devices 204B, 204n, CPU devices 206B, 206n, memory devices 208B, 208n, and network devices 210B, 210n) are unassigned hardware resources which are available on-demand for a respective tenant 212A-n workload.

Each respective tenant 212A-n may be assigned individual respective hardware resources 200 in arbitrary quantities. In one embodiment, each respective tenant 212A-n may be assigned an arbitrary quantity of an individual respective hardware resource 200 within a limit of total system capacity and/or an available quantity of the respective hardware resources 200. For example, a memory device 208A-n allocated from the memory pool to a respective tenant 212A-n may be provided in a minimal unit of allocation (e.g. a byte or word) up to a limit of total system capacity and/or an available quantity of the memory devices 208A-n.

In another embodiment, each respective tenant 212A-n may be assigned individual respective hardware resources 200 within a quantum step sizing restriction. For example, memory devices 208A-n may need to be allocated on quantum sizes of full or half of memory DIMM units, to assure full bandwidth from the respective memory device 208A-n to the processor when reading/writing data. This is especially true in a disaggregated system since the memory device 208A-n is directly connected via fiber/optical switch to the processor memory unit (for read/write memory transactions) as if it was locally connected to the processor chip, but rather may be a small distance (e.g. 1 meter) away in location. In another example, because the disaggregated system is not based on virtual components but rather physical components (i.e. actual chips than cores or VMs), the quantum sizing restriction may require that a minimum of one CPU device 206A-n be assigned to a tenant 212A-n, with additional CPU devices 206A-n being provisioned to the tenant 212A-n in two, four, etc. quantities.

In-Line Hardware Component Upgrades

In various embodiments, the functionality of the present invention leverages the point-to-point circuit wire level switching and hardware pooling attributes of disaggregated systems to provide an efficient mechanism for live, in-line (without redundancy) hardware upgrades. As aforementioned, in this type of disaggregated system, like resources are organized into pools which can be directly connected to resources of another pool. An effectively provisioned "system" will be composed of a set of computing resources connected in a point-to-point fashion to memory and storage resources, etc.

In the case of hardware upgrade, new hardware can be placed in a neighboring resource pool and switched into the workload's provisioned system to evaluate the performance of the new hardware component(s) against upgrade goals (typically any combination of base compatibility, lower energy usage, or increased performance) in real-time while having no interruption to the running workload. The low impact nature of this upgrade method allows administrators to speculatively try new hardware components to determine their true impact in their most important workloads before determining the permanent strategy for their systems.

Figure 3:
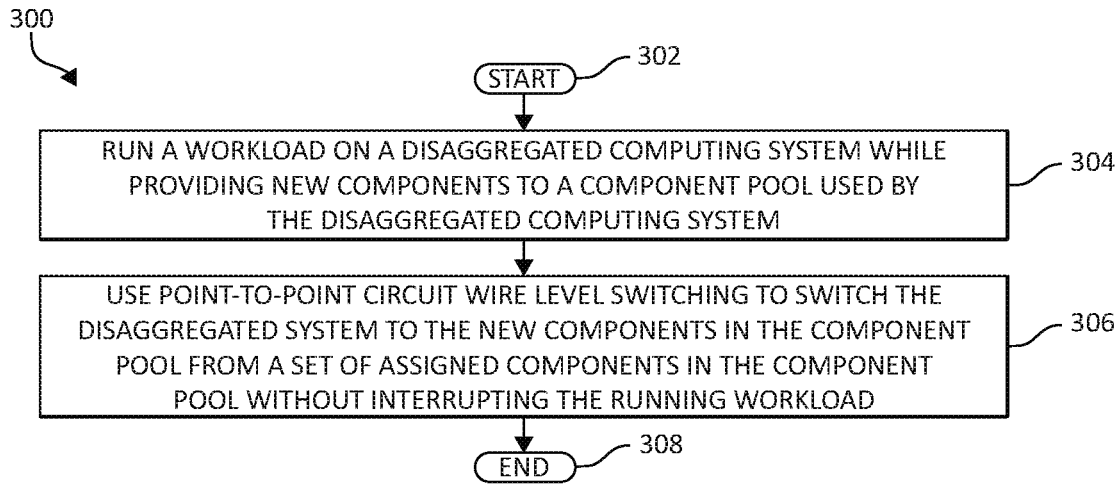
FIG. 3 is a flowchart diagram illustrating a method for performing hardware upgrades in a disaggregated computing environment in accordance with various aspects of the present invention.

Continuing, FIG. 3 illustrates a method 300 for performing hardware upgrades in a disaggregated computing environment. The method 300 may be performed in accordance with the present invention in any of the environments depicted in FIGS. 1, 2, and 4-7 (described infra), among others, in various embodiments. Of course, more or less operations than those specifically described in FIG. 3 may be included in method 300, as would be understood by one of skill in the art upon reading the present descriptions.

Each of the steps of the method 300 may be performed by any suitable component of the operating environment. For example, in various embodiments, the method 300 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a Central Processing Unit (CPU), an Application Specific Integrated Circuit (ASIC), a Field Programmable Gate Array (FPGA), etc., combinations thereof, or any other suitable computing device known in the art.

The method 300 begins (step 302) by running a workload on a disaggregated computing system while providing a new component to at least one of a plurality of component pools used by the disaggregated computing system (step 304). Point-to-point circuit wire level switching is used to switch the disaggregated system from an assigned component residing in a first of the plurality of component pools to the new component residing in a second of the plurality of component pools without interrupting the running workload (step 306). In some embodiments, a test may be performed on the new component as to determine whether the new component produces an expected or satisfactory performance, power, or compatibility result (e.g. the upgraded component performs at a speed or power level as expected or the upgraded component is shown to be compatible with the system). If the test result is not satisfactory, the same mechanisms may then be used to switch the assigned component back into the disaggregated system, as will be further described. The method ends (step 308).

It should be noted that, when referring to "no interruption" in the running workload within the present disclosure, the intended meaning refers to no stoppage of the running workload. In an actual implementation of the present invention, there may be a very minimal period of slowing of workload performance which may or may not be noticeable to the user. In other words, the workload does not need to be stopped; however, during the actual switching of components from the assigned components to the new components, a minimal disruption to the normal performance of the workload may be experienced which is either not or negligibly perceived by the user.

To facilitate a clearer understanding of the mechanisms of the present invention, FIGS. 4-7, following, are combination block and flowchart diagrams illustrating various hardware component upgrade methods for different types of hardware. In each, the illustrated block diagrams are provided as reference to the steps included in the method flowcharts also therein.

Figure 4:
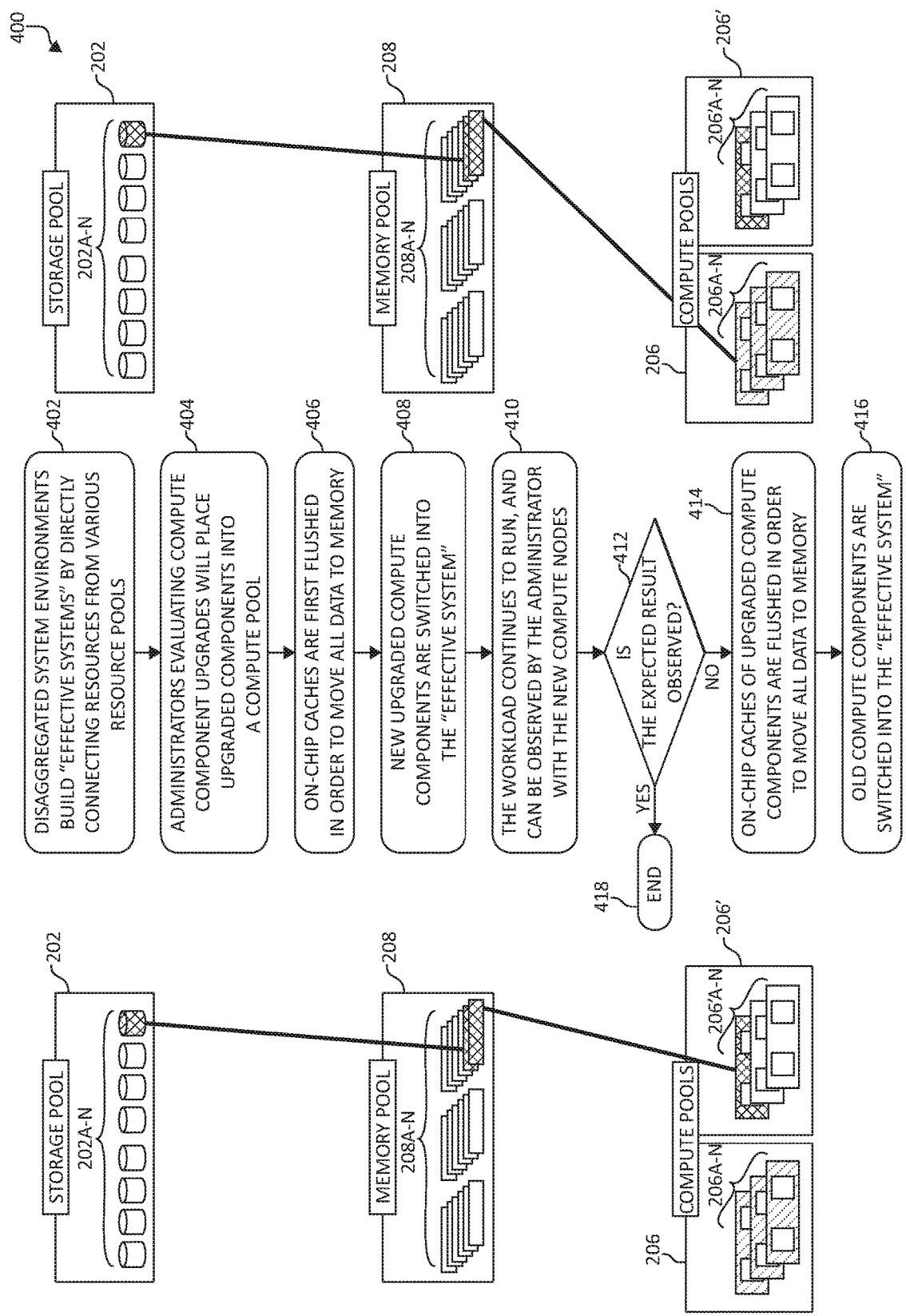
FIG. 4 is a combination block and flowchart diagram illustrating a method for performing compute component hardware upgrades in a disaggregated computing environment in accordance with various aspects of the present invention.

FIG. 4 is a combination block and flowchart diagram illustrating a method 400 for performing hardware upgrades to compute components in a disaggregated computing environment. The method 400 begins by building, by the disaggregated environment, an "effective" or "composed" system using various resources within the pools of resources (step 402). In this depiction, the effective system has been composed from one or more storage devices 202A-n from storage pool 202, one or more memory devices 208A-n from memory pool 208, and one or more CPU devices 206'A-n from CPU device pool 206'.

The method 400 continues as administrators evaluating the compute component (CPU devices) upgrades place (or "install") the upgraded CPU device(s) 206A-n into CPU device pool 206 (step 404). On-chip caches of the CPU devices 206'A-n are first flushed in order to move all the data therein to memory (step 406). A switch of components is then made and the upgraded CPU device(s) 206A-n in CPU device pool 206 are switched via the point-to-point circuit wire level switching into the effective system (step 408). The running workload (which has not been interrupted) continues to run and is observed by the administrator with the upgraded CPU device(s) 206A-n working in the effective system (step 410). A determination is then made at step 412 as to whether the expected result is observed by the administrator. The expected result may be an observation of a performance standpoint (e.g. input/output operations per second (TOPS), bandwidth metrics, latency metrics, etc.) or the performance standpoint may include other factors, such as a power consumption of the new components or whether the new components are compatible with the other hardware running in the system. If the expected result is observed at step 412, the method ends (step 418).

If, at step 412, the expected result is not observed, a test of hardware, software, or other administrative processes is not satisfactory, the on-chip caches of the CPU device(s) 206A-n in the CPU device pool 206 are flushed in order to move all data from the upgraded components to memory (step 414), and the previously assigned (old) CPU device(s) 206'A-n in CPU device pool 206' are switched back into the effective system (step 416). At this point, the administrator may remove the upgraded CPU device(s) 206A-n from CPU device pool 206 and explore alternative options (e.g. try the upgrade with an alternative component or leave the effective system as originally found).

Figure 5:
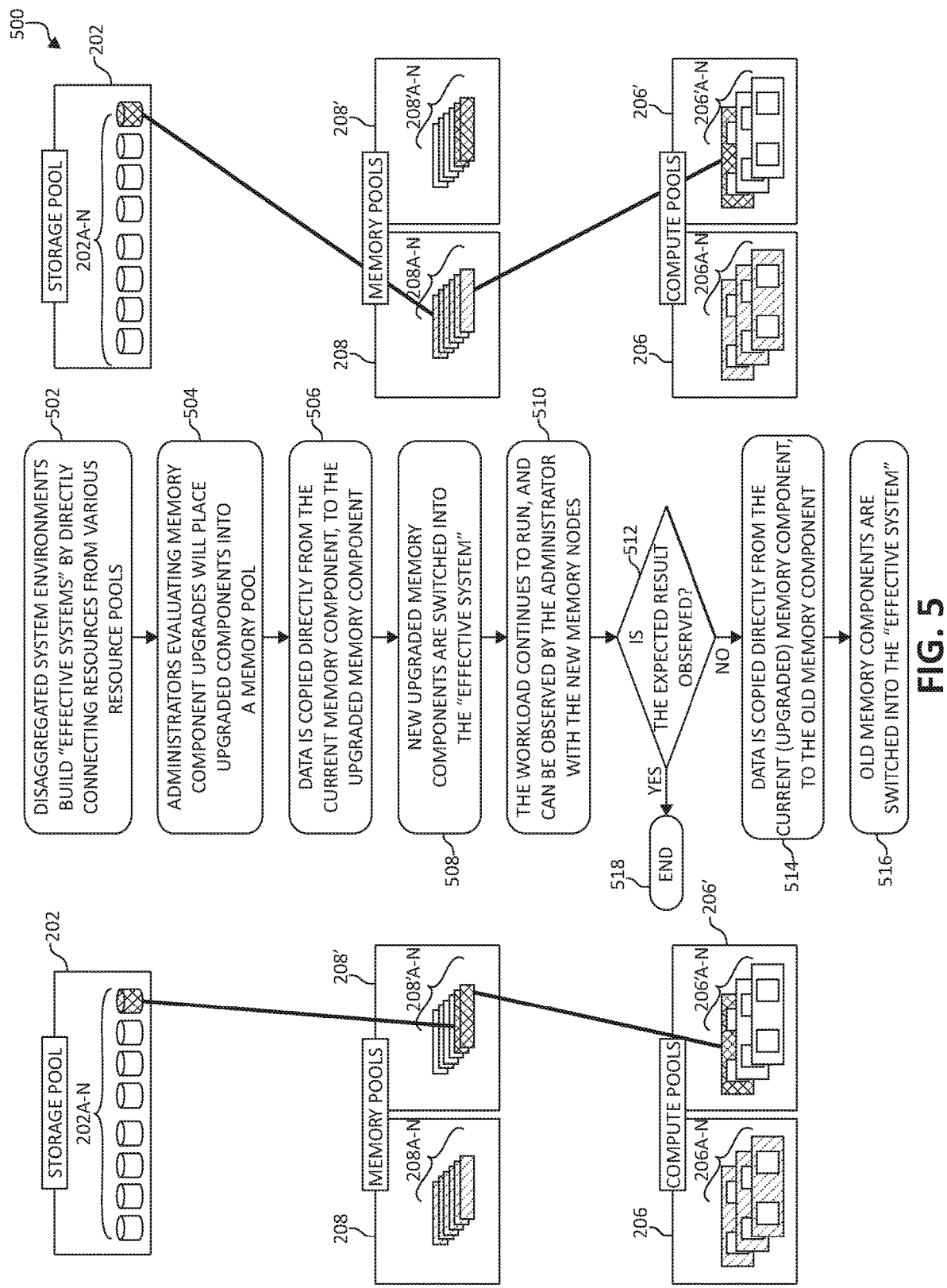
FIG. 5 is an additional combination block and flowchart diagram illustrating a method for performing memory component hardware upgrades in a disaggregated computing environment in accordance with various aspects of the present invention.

FIG. 5 is a combination block and flowchart diagram illustrating a method 500 for performing hardware upgrades to memory components in a disaggregated computing environment. The method 500 begins by building, by the disaggregated environment, an effective system using various resources within the pools of resources (step 502). In this example, the effective system has been composed from one or more storage devices 202A-n from storage pool 202, one or more memory devices 208'A-n from memory pool 208', and one or more CPU devices 206'A-n from CPU device pool 206'.

The method 500 continues as administrators evaluating the memory component upgrades place the upgraded memory device(s) 208A-n into memory device pool 208 (step 504). Data stored within the memory device(s) 208'A-n in memory device pool 208' is directly copied to the upgraded memory device(s) 208A-n in memory device pool 208 (step 506). This data copy may use an efficient pool-to-pool optical connection in order to significantly expedite the completion of the copy. A switch of components is then made and the upgraded memory device(s) 208A-n in memory device pool 208 are switched via the point-to-point circuit wire level switching into the effective system (step 508). The running workload (which has not been interrupted) continues to run and is observed by the administrator with the upgraded memory device(s) 208A-n working in the effective system (step 510). A determination is then made at step 512 as to whether the expected result (after a series of observations/tests) is observed by the administrator. If the expected result is observed at step 512, the method ends (step 518).

If, at step 512, the expected result is not observed, a test of hardware, software, or other administrative processes is not satisfactory, the data stored within the memory device(s) 208A-n in memory device pool 208 is directly copied to the previously assigned memory device(s) 208'A-n in memory device pool 208' (step 514), and the previously assigned (old) memory device(s) 208'A-n in memory device pool 208' are switched back into the effective system (step 516). As aforementioned, at this point, the administrator may remove the upgraded memory device(s) 208A-n from memory device pool 208 and explore alternative options (e.g. try the upgrade with an alternative component or leave the effective system as originally found).

Figure 6:
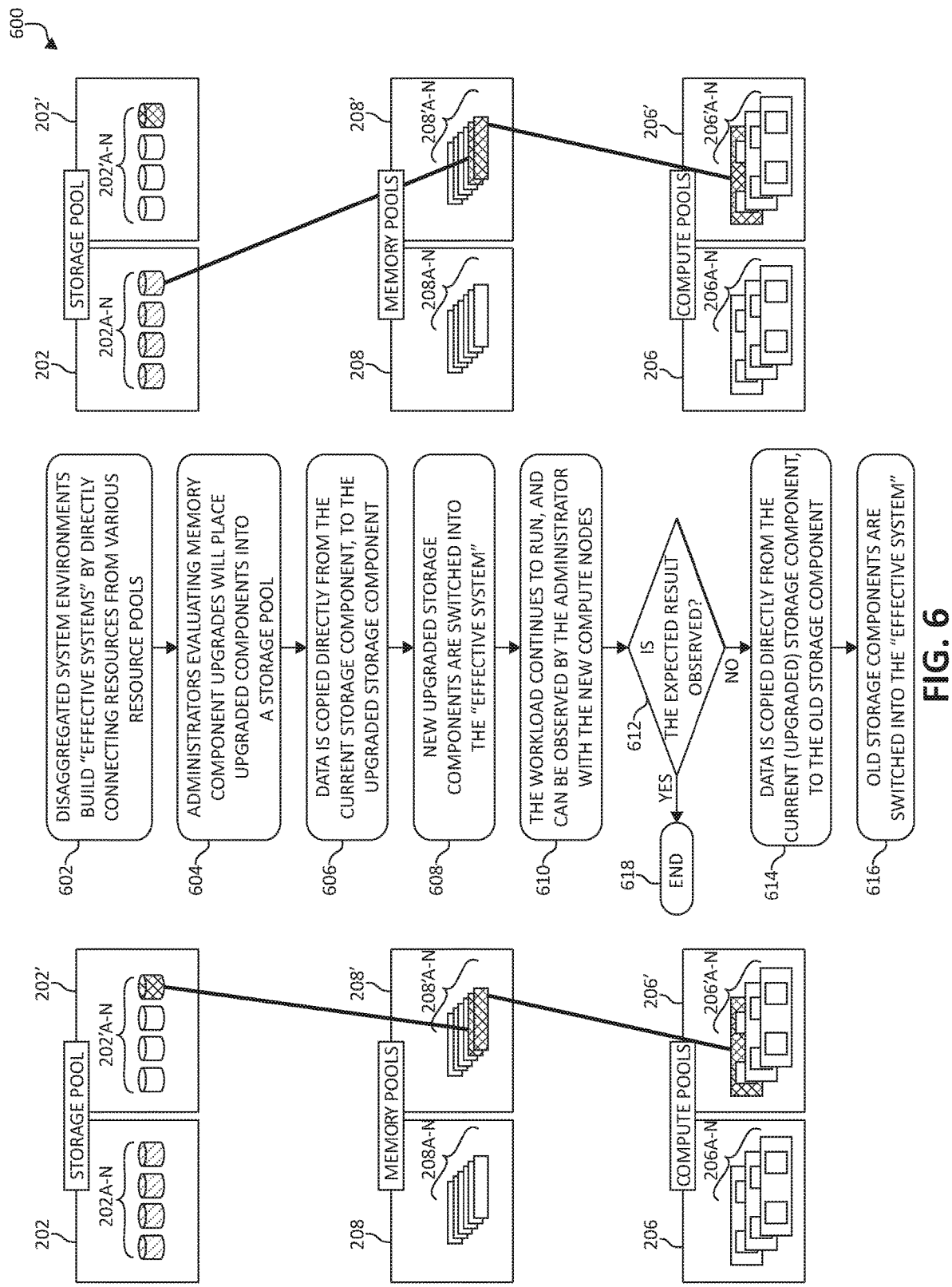
FIG. 6 is an additional combination block and flowchart diagram illustrating a method for performing storage component hardware upgrades in a disaggregated computing environment in accordance with various aspects of the present invention.

Advancing, FIG. 6 is a combination block and flowchart diagram illustrating a method 600 for performing hardware upgrades to storage components in a disaggregated computing environment. The method 600 begins by building, by the disaggregated environment, an effective system using various resources within the pools of resources (step 602). In this illustration, the effective system has been composed from one or more storage devices 202'A-n from storage pool 202', one or more memory devices 208'A-n from memory pool 208', and one or more CPU devices 206'A-n from CPU device pool 206'.

The method 600 continues as administrators evaluating the storage component upgrades place the upgraded storage device(s) 202A-n into storage device pool 202 (step 604). Data stored within the storage device(s) 202'A-n in storage device pool 202' is directly copied to the upgraded storage device(s) 202A-n in storage device pool 202 (step 606). A switch of components is then made and the upgraded storage device(s) 202A-n in storage device pool 202 are switched via the point-to-point circuit wire level switching into the effective system (step 608). The workload continues to run and is observed by the administrator with the upgraded storage device(s) 202A-n operating in the effective system (step 610). A determination is then made at step 612 as to whether the expected result (after a series of observations/tests) is observed by the administrator. If the expected result is observed at step 612, the method ends (step 618).

If, at step 612, the expected result is not observed, a test of hardware, software, or other administrative processes is not satisfactory, the data stored within the storage device(s) 202A-n in storage device pool 202 is directly copied to the previously assigned storage device(s) 202'A-n in storage device pool 202' (step 614), and the previously assigned (old) storage device(s) 202'A-n in storage device pool 202' are switched back into the effective system (step 616). Again, as aforementioned, at this point, the administrator may remove the upgraded storage device(s) 202A-n from storage device pool 202 and explore alternative options (e.g. try the upgrade with an alternative component or leave the effective system as originally found).

Figure 7:
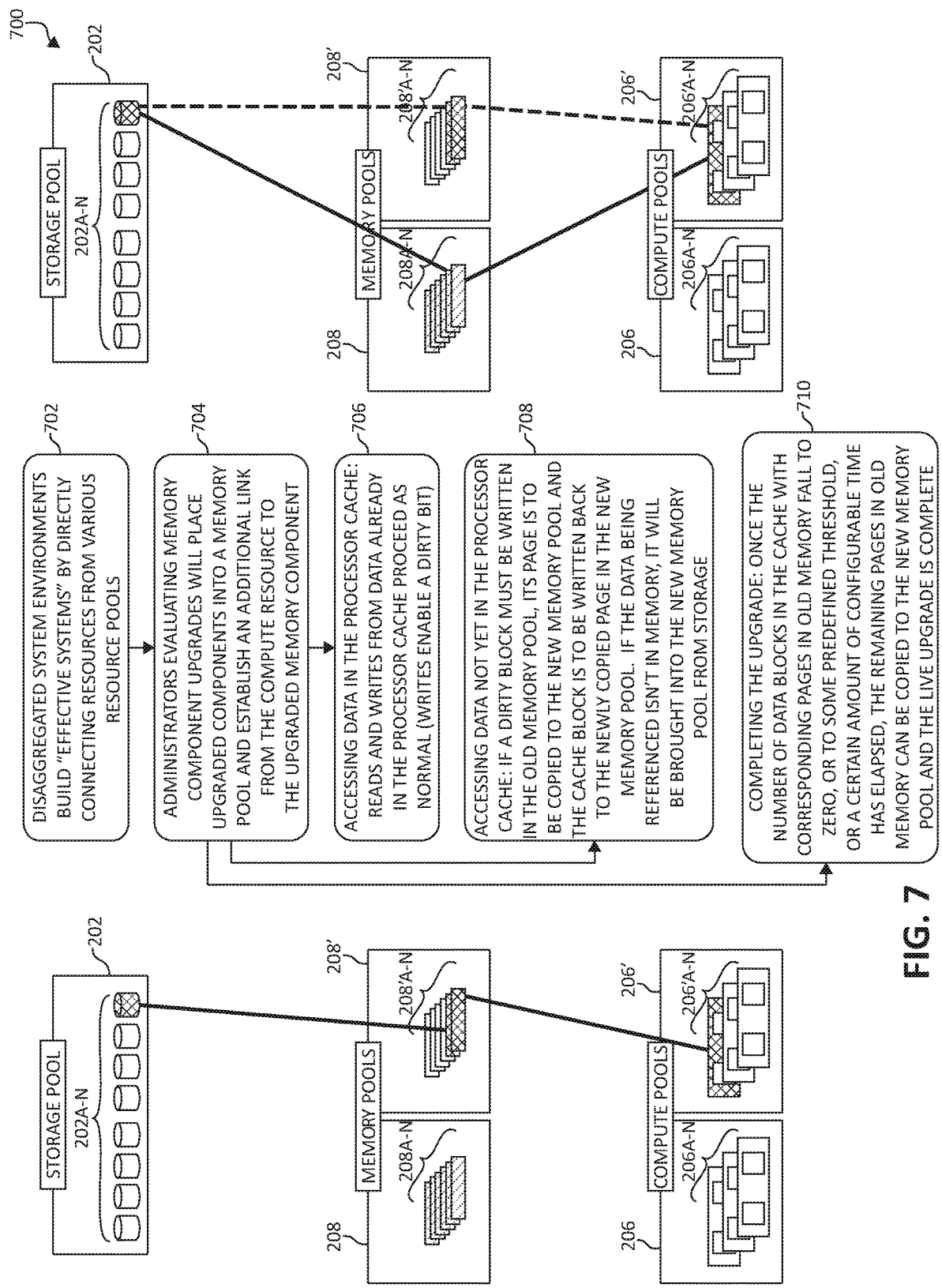
FIG. 7 is still an additional combination block and flowchart diagram illustrating a method for performing less-impact gradual memory component hardware upgrades in a disaggregated computing environment in accordance with various aspects of the present invention.

Concluding, FIG. 7 is a combination block and flowchart diagram illustrating a method 700 for performing hardware upgrades to memory components in a disaggregated computing environment. The method 700 illustrates an alternative embodiment than that depicted in FIG. 5 for reducing the performance impact of immediately copying all data from previously assigned memory components to the new, upgraded memory components by implementing a gradual data migration process. The method 700 begins again, by building, by the disaggregated environment, an effective system using various resources within the pools of resources (step 702). In this illustration, the effective system has been composed from one or more storage devices 202A-n from storage pool 202, one or more memory devices 208'A-n from memory pool 208', and one or more CPU devices 206'A-n from CPU device pool 206'.

The method 700 continues as administrators evaluating the memory component upgrades place the upgraded memory device(s) 208A-n into memory device pool 208 and establish an additional link from the compute resource (CPU device(s) 206'A-n) between both the upgraded memory device(s) 208A-n in memory device pool 208 and the previously assigned memory device(s) 208'A-n in memory device pool 208' (step 704). This additional link enables the upgraded memory device(s) 208A-n in memory device pool 208 to work in tandem with the previously assigned memory device(s) 208'A-n in memory device pool 208' as to gradually fill the upgraded memory device(s) 208A-n with the data being read, written to, or held by the previous memory device(s) 208'A-n.

From step 704, when accessing data in the processor (i.e. CPU device(s) 206'A-n) cache, reads and writes from data already held in the processor cache proceed as normal operation, where writes enable a dirty bit (step 706). When accessing data not in the processor cache, if a dirty block must be written in the previously assigned memory pool (memory device pool 208'), its page is copied to the upgraded memory pool (memory device pool 208) and the cache block is written back to the newly copied page in the upgraded memory device pool 208. If the data being referenced is not in memory, the data will be brought into the upgraded memory pool (memory device(s) 208A-n in memory device pool 208) from storage (storage device pool 202) (step 708).

For completing the upgrade of the memory component hardware, once the number of data blocks in the processor cache with corresponding pages in the previously assigned memory devices 208'A-n in memory device pool 208' falls to zero, a predetermined threshold number, and/or a predefined time period has elapsed, the remaining pages in the previously assigned memory device(s) 208'A-n in memory device pool 208' are copied to the upgraded memory device(s) 208A-n in memory device pool 208, and the live upgrade is completed (step 710).

The present invention may be an apparatus, a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

What is claimed is:

1. A method for performing hardware upgrades in a disaggregated computing environment, by a processor device, comprising:
    maintaining, in the disaggregated computing environment, a plurality of component pools each physically separated from one another and having a plurality of like-typed resources residing therein, wherein the plurality of component pools include a plurality of compute component pools, each of the plurality of compute component pools composed exclusively of processors, a plurality of memory component pools, each of the plurality of memory component pools composed exclusively of memory devices, and a plurality of storage component pools, each of the plurality of storage component pools composed exclusively of storage devices;
    instantiating, in real-time, a dynamically constructed non-virtualized server entity operating as a disaggregated computing system composed of individual hardware components each selected from respective pools of the plurality of component pools, wherein the individual hardware components used to dynamically construct the disaggregated computing system are individual ones of the processors, memory devices, and storage devices respectively selected from the plurality of component pools;

running a workload on the disaggregated computing system while physically installing a new component comprised of a single processor of the processors, a single memory device of the memory devices, or a single storage device of the storage devices to at least one of the plurality of component pools used by the disaggregated computing system; and using point-to-point circuit wire level switching to switch the disaggregated system from an assigned component residing in a first of the plurality of component pools to the new component residing in a second of the plurality of component pools without pause and interruption of the running workload; wherein the point-to-point wire level switching comprises switching an optical link established between the disaggregated computing system and the assigned component to the new component.

2. The method of claim 1, wherein the new component is a new compute component in one of the plurality of compute component pools, the method further including:

pursuant to switching the disaggregated computing system to the new compute component in the second of the plurality of component pools, flushing an on-chip cache of the assigned component to move cached data to memory.

3. The method of claim 1, further including continuing to run the workload while using the new component in the disaggregated computing system; and testing the running workload to produce a test result.

4. The method of claim 3, further including, responsive to the test result being negative, using the point-to-point circuit wire level switching to switch the disaggregated computing system back to the assigned component in the first of the plurality of component pools.

5. The method of claim 4, wherein the new component is a new memory component in one of the plurality of memory component pools or a new storage component in one of the plurality of storage component pools, the method further including:

copying data directly from the assigned component to the new memory component or the new storage component.

6. The method of claim 5, further including, responsive to the test result being negative, copying data directly from the new memory component or the new storage component to the assigned component before switching the disaggregated computing system back to the assigned component.

7. The method of claim 1, wherein the new component is a new memory component in one of the plurality of memory component pools, the method further including:

establishing a link between a processing component to both the new memory component and an assigned memory component;

when new data must be read from storage, reading the new data into the new memory component in lieu of reading the new data into the assigned memory component; and when a dirty block must be written in the assigned memory component, copying a page belonging to the dirty block to the new memory component and a data block in a cache to the copied page in the new memory component.

8. The method of claim 7, further including, upon a number of data blocks in the cache having corresponding pages in the assigned memory component equaling zero, falling below a predetermined threshold or a predetermined time period has elapsed, copying all remaining pages from the assigned memory component to the new memory component.

9. A system for performing hardware upgrades in a disaggregated computing environment, the system comprising:

at least one processor; and
at least one non-transitory memory storing executable program code and coupled to the at least one processor, wherein, when executing the executable program code, the at least one processor:

maintains, in the disaggregated computing environment, a plurality of component pools each physically separated from one another and having a plurality of like-typed resources residing therein, wherein the plurality of component pools include a plurality of compute component pools, each of the plurality of compute component pools composed exclusively of processors, a plurality of memory component pools, each of the plurality of memory component pools composed exclusively of memory devices, and a plurality of storage component pools, each of the plurality of storage component pools composed exclusively of storage devices;

instantiates, in real-time, a dynamically constructed non-virtualized server entity operating as a disaggregated computing system composed of individual hardware components each selected from respective pools of the plurality of component pools, wherein the individual hardware components used to dynamically construct the disaggregated computing system are individual ones of the processors, memory devices, and storage devices respectively selected from the plurality of component pools;

runs a workload on the disaggregated computing system while physically installing a new component comprised of a single processor of the processors, a single memory device of the memory devices, or a single storage device of the storage devices to at least one of the plurality of component pools used by the disaggregated computing system; and uses point-to-point circuit wire level switching to switch the disaggregated system from an assigned component residing in a first of the plurality of component pools to the new component residing in a second of the plurality of component pools without pause and interruption of the running workload; wherein the point-to-point wire level switching comprises switching an optical link established between the disaggregated computing system and the assigned component to the new component.

10. The system of claim 9, wherein the new component is a new compute component in one of the plurality of compute component pools; and wherein the at least one processor:

pursuant to switching the disaggregated computing system to the new compute component in the second of the plurality of component pools, flushes an on-chip cache of the assigned component to move cached data to memory.

11. The system of claim 9, wherein the at least one processor continues to run the workload while using the new component in the disaggregated computing system; and tests the running workload to produce a test result.

12. The system of claim 11, wherein the at least one processor, responsive to the test result being negative, uses the point-to-point circuit wire level switching to switch the disaggregated computing system back to the assigned component in the first of the plurality of component pools.

13. The system of claim 12, wherein the new component is a new memory component in one of the plurality of memory component pools or a new storage component in one of the plurality of storage component pools, and wherein the at least one processor:
   copies data directly from the assigned component to the new memory component or the new storage component.

14. The system of claim 13, wherein the at least one processor, responsive to the test result being negative, copies data directly from the new memory component or the new storage component to the assigned component before switching the disaggregated computing system back to the assigned component.

15. The system of claim 9, wherein the new component is a new memory component in one of the plurality of memory component pools, and wherein the at least one processor:
   establishes a link between a processing component to both the new memory component and an assigned memory component;
   when new data must be read from storage, reads the new data into the new memory component in lieu of reading the new data into the assigned memory component; and
   when a dirty block must be written in the assigned memory component, copies a page belonging to the dirty block to the new memory component and a data block in a cache to the copied page in the new memory component.

16. The system of claim 15, wherein the at least one processor, upon a number of data blocks in the cache having corresponding pages in the assigned memory component equaling zero, falling below a predetermined threshold or a predetermined time period has elapsed, copies all remaining pages from the assigned memory component to the new memory component.

17. A computer program product for performing hardware upgrades in a disaggregated computing environment, by a processor device, the computer program product embodied on a non-transitory computer-readable storage medium having computer-readable program code portions stored therein, the computer-readable program code portions comprising:
   an executable portion that maintains, in the disaggregated computing environment, a plurality of component pools each physically separated from one another and having a plurality of like-typed resources residing therein, wherein the plurality of component pools include a plurality of compute component pools, each of the plurality of compute component pools composed exclusively of processors, a plurality of memory component pools, each of the plurality of memory component pools composed exclusively of memory devices, and a plurality of storage component pools, each of the plurality of storage component pools composed exclusively of storage devices;
   an executable portion that instantiates, in real-time, a dynamically constructed non-virtualized server entity operating as a disaggregated computing system composed of individual hardware components each selected from respective pools of the plurality of component pools, wherein the individual hardware components used to dynamically construct the disaggregated computing system are individual ones of the processors, memory devices, and storage devices respectively selected from the plurality of component pools;
   an executable portion that runs a workload on the disaggregated computing system while physically installing a new component comprised of a single processor of the processors, a single memory device of the memory devices, or a single storage device of the storage devices to at least one of the plurality of component pools used by the disaggregated computing system; and
   an executable portion that uses point-to-point circuit wire level switching to switch the disaggregated system from an assigned component residing in a first of the plurality of component pools to the new component residing in a second of the plurality of component pools without pause and interruption of the running workload; wherein the point-to-point wire level switching comprises switching an optical link established between the disaggregated computing system and the assigned component to the new component.

18. The computer program product of claim 17, wherein the new component is a new compute component in one of the plurality of compute component pools, and further including an executable portion that:
   pursuant to switching the disaggregated computing system to the new compute component in the second of the plurality of component pools, flushes an on-chip cache of the assigned component to move cached data to memory.

19. The computer program product of claim 17, further including an executable portion that continues to run the workload while using the new component in the disaggregated computing system; and
   an executable portion that tests the running workload to produce a test result.

20. The computer program product of claim 19, further including an executable portion that, responsive to the test result being negative, uses the point-to-point circuit wire level switching to switch the disaggregated computing system back to the assigned component in the first of the plurality of component pools.

21. The computer program product of claim 20, wherein the new component is a new memory component in one of the plurality of memory component pools or a new storage component in one of the plurality of storage component pools, and further including:
   an executable portion that copies data directly from the assigned component to the new memory component or the new storage component.

22. The computer program product of claim 21, further including an executable portion that, responsive to the test result being negative, copies data directly from the new memory component or the new storage component to the assigned component before switching the disaggregated computing system back to the assigned component.

23. The computer program product of claim 17, wherein the new component is a new memory component in one of the plurality of memory component pools, and further including:
   an executable portion that establishes a link between a processing component to both the new memory component and an assigned memory component;
   an executable portion that, when new data must be read from storage, reads the new data into the new memory component in lieu of reading the new data into the assigned memory component; and
   an executable portion that, when a dirty block must be written in the assigned memory component, copies a page belonging to the dirty block to the new memory component and a data block in a cache to the copied page in the new memory component.

24. The computer program product of claim 23, further including an executable portion that, upon a number of data blocks in the cache having corresponding pages in the assigned memory component equaling zero, falling below a predetermined threshold or a predetermined time period has elapsed, copies all remaining pages from the assigned memory component to the new memory component.

* * * * *